(12) United States Patent
Asia et al.

(10) Patent No.: US 7,123,650 B2
(45) Date of Patent: Oct. 17, 2006

(54) OFFSET CARRIER FREQUENCY CORRECTION IN A TWO-WAY BROADBAND WIRELESS ACCESS SYSTEM

(75) Inventors: Raul Asia, Jerusalem (IL); Jehuda Ben Simon, Jerusalem (IL); Amnon Jonas, Jerusalem (IL); Oren Mizrahi, Jerusalem (IL); Jack Bettan, Jerusalem (IL); Yaron Fishler, Jerusalem (IL); Eric K. Wilson, Cupertino, CA (US)

(73) Assignee: Vyyo, Inc., Palo Alto, CA (US)

( * ) Notice: Subject to any disclaimer, the term of this patent is extended or adjusted under 35 U.S.C. 154(b) by 948 days.

(21) Appl. No.: 09/771,200

(22) Filed: Jan. 26, 2001

(65) Prior Publication Data
US 2001/0053180 A1 Dec. 20, 2001

Related U.S. Application Data

(60) Provisional application No. 60/178,136, filed on Jan. 26, 2000.

(51) Int. Cl.
*H04B 1/38* (2006.01)

(52) U.S. Cl. .................................... 375/222

(58) Field of Classification Search ............. 375/354, 375/358, 326, 324, 376, 346, 322, 316, 373, 375/371, 222; 455/69, 68, 39; 329/306, 329/307, 304
See application file for complete search history.

(56) References Cited

U.S. PATENT DOCUMENTS

| | | | |
|---|---|---|---|
| 4,010,465 A | 3/1977 | Dodington et al. | |
| 4,099,121 A | 7/1978 | Fang | |
| 4,385,384 A | 5/1983 | Rosbury et al. | |
| 5,052,024 A | 9/1991 | Moran, III et al. | |
| 5,272,700 A | 12/1993 | Hansen et al. | |
| 5,311,550 A | 5/1994 | Fouche et al. | |
| 5,377,035 A | 12/1994 | Wang et al. | |
| 5,408,349 A | 4/1995 | Tsushima et al. | |
| 5,444,736 A * | 8/1995 | Kawashima et al. | ........ 375/219 |
| 5,471,645 A | 11/1995 | Felix | |
| 5,481,542 A | 1/1996 | Logston et al. | |
| 5,481,561 A | 1/1996 | Fang | |
| 5,487,099 A | 1/1996 | Maekawa | |
| 5,510,859 A | 4/1996 | Douglass et al. | |

(Continued)

FOREIGN PATENT DOCUMENTS

CA 2187141 4/1998

(Continued)

OTHER PUBLICATIONS

Federal Standard 1037C, Telecommunications: Glossary of Telecommunication Terms, Date of Publication: Aug. 7, 1996: http://www.its.bldrdoc.gov/fs-1037/37search.htm.*

*Primary Examiner*—Pankaj Kumar
(74) *Attorney, Agent, or Firm*—John Carpenter; Reed Smith, LLP (57) ABSTRACT

A method for correcting for the offset carrier frequency in a wireless modem is provided. The method further allows for the periodic correction of the offset of the carrier frequency. A Fine tuning method is implemented that uses fine tuning frequency increments to determine minimum and maximum edges of a received frequency from which to calculate an offset used to adjust the transmitted frequency or the receiver of the wireless modem. Power correction is performed for variances in received signal power by adjusting an output power relative to differences in received power compared to an expected received power value.

14 Claims, 6 Drawing Sheets

U.S. PATENT DOCUMENTS

| | | |
|---|---|---|
| 5,557,612 A | 9/1996 | Bingham |
| 5,590,409 A | 12/1996 | Sawahashi et al. |
| 5,596,604 A | 1/1997 | Cioffi et al. |
| 5,606,664 A | 2/1997 | Brown et al. |
| 5,625,874 A | 4/1997 | Uchida et al. |
| 5,634,206 A | 5/1997 | Reed et al. |
| 5,666,646 A | 9/1997 | McCollum et al. |
| 5,724,385 A | 3/1998 | Levin et al. |
| 5,734,589 A | 3/1998 | Kostreski et al. |
| 5,740,525 A * | 4/1998 | Spears ................... 455/259 |
| 5,752,161 A | 5/1998 | Jantti et al. |
| 5,796,783 A | 8/1998 | Crawford |
| 5,809,090 A | 9/1998 | Buternowsky et al. |
| 5,809,406 A | 9/1998 | Taki et al. |
| 5,809,427 A | 9/1998 | Perreault et al. |
| 5,818,825 A | 10/1998 | Corrigan et al. |
| 5,831,690 A | 11/1998 | Lyons et al. |
| 5,862,451 A | 1/1999 | Grau et al. |
| 5,867,528 A | 2/1999 | Verbueken |
| 5,896,414 A | 4/1999 | Meyer et al. |
| 5,903,558 A | 5/1999 | Jones et al. |
| 5,909,384 A | 6/1999 | Tal et al. |
| 5,937,005 A | 8/1999 | Obuchi et al. |
| 5,940,743 A | 8/1999 | Sunay et al. |
| 5,963,843 A | 10/1999 | Sit et al. |
| 5,963,870 A | 10/1999 | Chheda et al. |
| 5,974,106 A | 10/1999 | Dupont |
| 5,978,855 A | 11/1999 | Metz et al. |
| 5,991,286 A | 11/1999 | Labonte et al. |
| 6,009,310 A | 12/1999 | Motohashi |
| 6,035,008 A | 3/2000 | Kim |
| 6,052,408 A | 4/2000 | Trompower et al. |
| 6,072,839 A | 6/2000 | Mondal et al. |
| 6,075,787 A | 6/2000 | Bobeck et al. |
| 6,111,887 A | 8/2000 | Daily et al. |
| 6,112,232 A | 8/2000 | Shahar et al. |
| 6,128,588 A | 10/2000 | Chacon |
| 6,140,911 A | 10/2000 | Fisher et al. |
| 6,141,356 A | 10/2000 | Gorman |
| 6,157,311 A | 12/2000 | Berkovich |
| 6,160,447 A | 12/2000 | Huang |
| 6,172,970 B1 | 1/2001 | Ling et al. |
| 6,185,227 B1 | 2/2001 | Sipola |
| 6,195,697 B1 | 2/2001 | Bowman-Amuah |

FOREIGN PATENT DOCUMENTS

| | | |
|---|---|---|
| EP | 0021 544 A1 | 1/1981 |
| EP | 0025 767 A1 | 3/1981 |

* cited by examiner

OFFSET CARRIER FREQUENCY CORRECTION IN A TWO-WAY BROADBAND WIRELESS ACCESS SYSTEM

CROSS REFERENCE TO RELATED APPLICATIONS

This invention is related to the following co-pending U.S. provisional patent applications, each of which are incorporated herein by reference, in their entirety:

Asia et al, Provisional Application Ser. No. 60/178,136, entitled "Offset Carrier Frequency Correction In A Two-way Broadband Access System," filed, Jan. 26, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to frequency correction, and more particularly to a method and apparatus for performing automatic frequency offset detection and correction in broadband wireless access systems.

2. Discussion of Background

Point to multipoint fixed broadband wireless access systems over MMDS networks are known in broadcast situations. These networks operate over licensed bands including the MMDS band (2,150 to 2,162 MHz), the WCS band (2,305 to 2,360 MHz) and the ITFS/MMDS bands (2,500 to 2,686 MHz).

Figure 1:
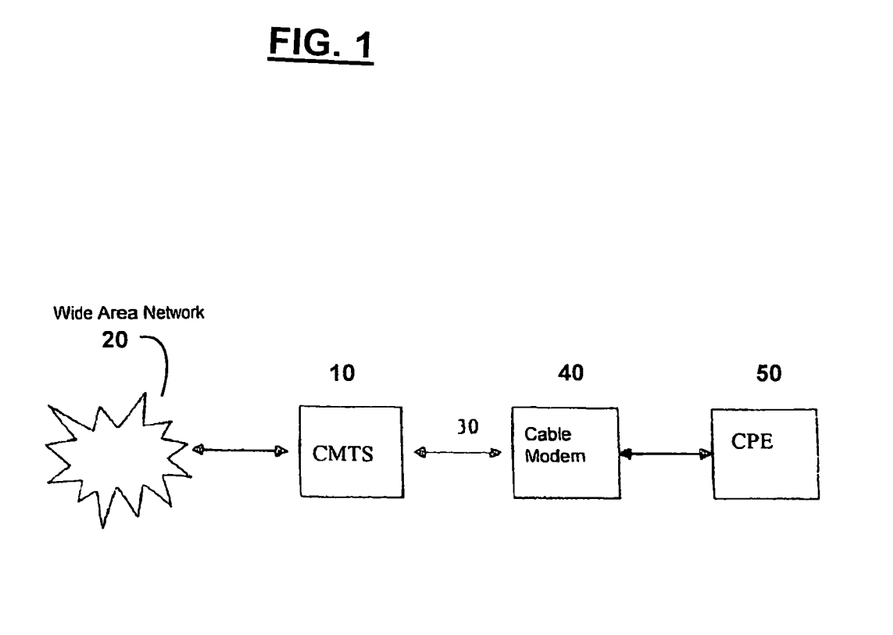
FIG. 1 is an overview of a known data over cable system.

A known cable based broadband access system, which operates at a range of between 50 MHz and 864 MHz, but not in the MMDS, WCS, or ITFS/MMDS bands, is the data over cable specification system, which is specified in the data over cable system interface specifications (DOCSIS). An overview of a cable based DOCSIS system is depicted in FIG. 1. A CMTS 10 communicates with a wide area network 20, such as the Internet. The CMTS 10 can transmit signals from the wide area network 20 along a cable network 30 through cable modems 40 to CPE 50 (Customer Premise Equipment—intended throughout this document to include a computer and/or all of the equipment at the customer site, such as a LAN—Local Area Network). CPE 50 messages can be transmitted to the wide area network 20 through the cable modem 40 along the cable network 30 to the CMTS 10.

In point to multipoint broadband access systems one central end-point, e.g. the head-end, communicates through a bi-directional link or links with multiple end-points, e.g. the nodes. The number of nodes in communication varies in time and can be none, one or two or more at any specific time.

The link(s) between the head-end and the nodes are combined in one or more channels. The signal path from the central end-point to the nodes is referred to as downstream, while the signal path from the nodes to the central end-point is referred to as upstream.

A single upstream channel can be used to deliver information from a node to the head-end, and a downstream channel from the head-end to a node or a group of nodes. If a single upstream channel is used for communication from the nodes(s) to the central point, then only one end-point can sends information on the single upstream channel at any one time.

Determining and maintaining accurate frequencies for downstream reception and upstream transmission is important for successful system operation. One way to determine and maintain accurate frequencies is to use sensitive but expensive circuit elements in the transceiver, or receiver and transmitter. The use of sensitive component will improve the frequency accuracy of the modem but will also lead to an expensive modem, making it difficult to sell the device at a reasonable price to the consumer.

In broadband access systems a very important time for a modem to be accurately detect and calibrate frequencies is when it wants to initiate communication with a cable modem termination system (CMTS) and therefore needs to register and be able to operate according to the appropriate parameters of the broadband wireless access system. It is during the registration procedure that modem needs to accurately determine the downstream and upstream frequencies in order to accurately transmit and receive during its communication period.

Therefore there exists a need for a modem that can accurately lock onto and maintain the downstream frequency in order to receive a reliable downstream data.

There also exists a need for a modem that can accurately lock onto and maintain the upstream frequency in order to transmit in the exact frequency without disturbing neighboring upstream channels.

However, it is further desired that creating a modem that can accurately lock onto and maintain both the downstream and upstream frequencies while at the same time reducing the need to use expensive components.

Another frequent problem in broadband wireless access systems occurs due to line of sight operation. The problem is very short duration interruptions in the in the physical transmission path between the wireless hub and the wireless modems is regarding very fast interruptions. The wireless modem needs to be able to make a fast reaction in order not to have data loss in its transmissions after these situations.

Therefore, it is desired that modem have the capability to compensate for short duration interruptions in the transmission path.

SUMMARY OF THE INVENTION

In one embodiment present invention provides a method for correcting for the offset carrier frequency in a wireless modem. The system and method further allowing for the periodic correction of the offset of the carrier frequency.

In another embodiment, the present invention provides an efficient method and system for determining the offset of the frequency of an upstream channel based upon the determination of the offset of the frequency of the upstream channel in a wireless user device.

In a further embodiment, the present invention provides for an efficient method and system for determining the offset of the frequency of the downstream channel in a wireless user device based upon the detection of the offset of the frequency of the upstream channel.

In yet another embodiment, the present invention provides for a method and system for correcting the upstream transmission power of a wireless user device based upon deviations in the signal power of a signal received by the wireless user device that was propagated on a downstream channel.

The present invention is embodied as a method for locking onto a downstream frequency by a wireless modem in a broadband wireless access system comprising, receiving at a radio coupled to the wireless modem, a plurality of signals at least one corresponding to a downstream signal being transmitted on a downstream frequency, determining, at the wireless modem, if the radio is locked onto the at least one downstream signal received at the radio, if the radio is locked onto the downstream signal, determining a center frequency of a detected frequency range corresponding to the downstream signal, if the radio is not locked onto the downstream data signal, changing a receiving frequency of the radio by signals from the wireless user device according to a predetermined frequency plan until the receiver is locked onto the one downstream signal and then determining the center frequency of the detected frequency range, determining a frequency offset factor, and transmitting an instruction from the wireless modem to the radio to operate a frequency other than the center frequency, the frequency other than the center frequency being a function of the frequency offset factor and center frequency.

The present invention also includes a method for compensating for signal power reduction in a wireless modem, comprising, determining a power of a received signal at a transceiver in a first downstream time slot, the power of the received signal being determined at a wireless modem coupled with the transceiver, if the power of the received signal is within a predetermined range, instructing the transceiver to transmit in a first upstream time slot a message at a predetermined upstream power, if the power of the received signal is outside the predetermined range, then transmitting in the first upstream time slot the message at a power that is the upstream power plus or minus the difference between the predetermined range and the power level of the received signal in the first downstream time slot, determining a power of a received signal at a transceiver in second downstream time slot, the power of the received signal being determined at a wireless modem coupled with the transceiver, if the power of the received signal in the second downstream time slot is within a predetermined range, instructing the transceiver to transmit in a second upstream time slot a message at a predetermined upstream power, if the power of the received signal is outside the predetermined range, then transmitting in the first upstream time slot the message at a power that is the upstream power plus or minus the difference between the predetermined range and the power level of the received signal in the second downstream time slot, and ceasing upstream transmission from the transceiver until power correction information is received at the transceiver.

The invention includes a device for locking onto a downstream frequency, comprising, a radio configured to: receive a plurality of signals, at least one of said plurality of signals being transmitted on said downstream channel, detect a center frequency of said downstream channel, determine an offset of said downstream frequency compared to a nominal frequency, and adjust a frequency so the offset is eliminated; and a device for compensating for signal power reduction, comprising, a power expectation device configured to determine an expected power level of a received signal, a power detection mechanism configured to determine an amount of power in a received signal, a calculation configured to determine if the power of the received signal is within a predetermined range of the expected power level and determine a variance between the expected power and received power level, and a transmitter control device configured to adjust an amount of power used to transmit a signal based on the variance if the received power is outside the predetermined range.

Both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
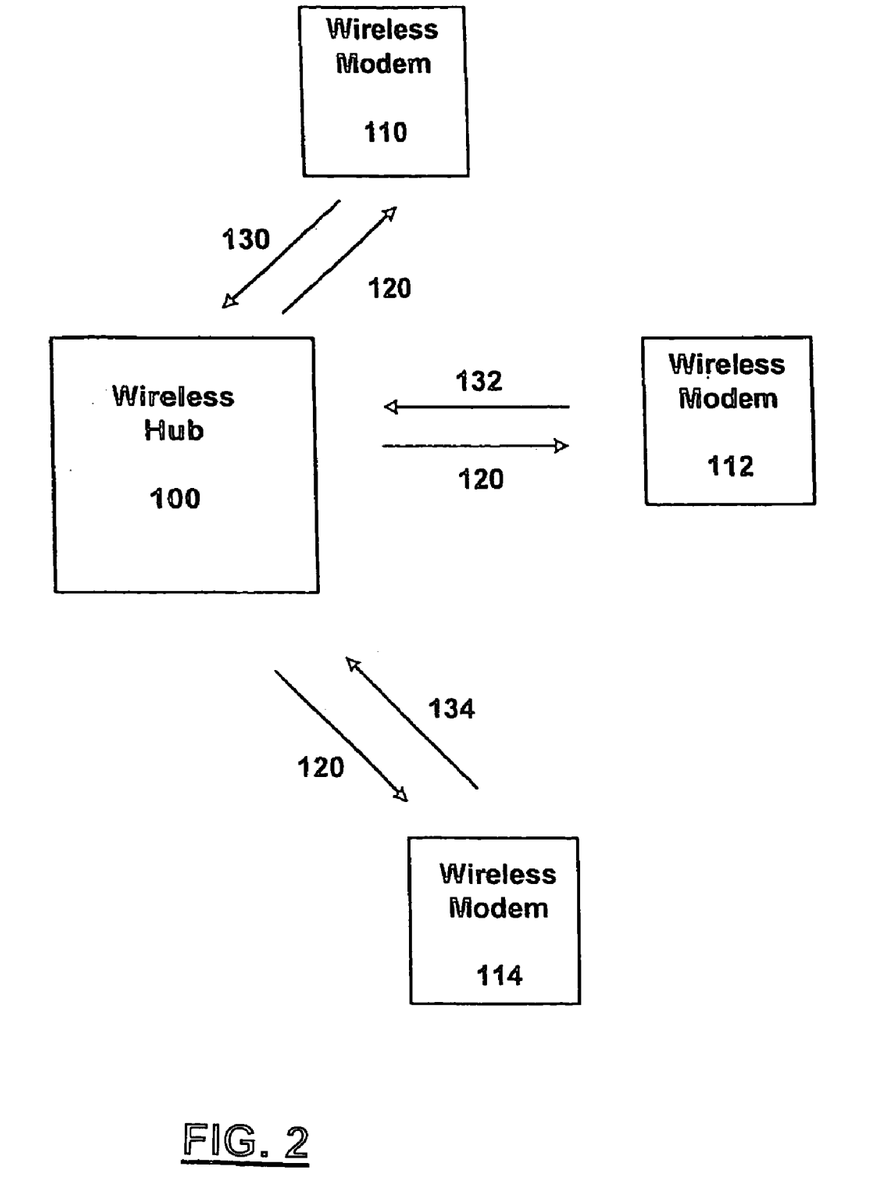
FIG. 2 is a block diagram of a wireless data over cable system according to an embodiment of the present invention.

Referring again to the drawings, wherein like reference numerals designate identical or corresponding parts, and more particularly to FIG. 2 thereof, there is illustrated a wireless modem 100 that is turned on (and needs to be initialized) or loses a signal (downstream transmission 102, for example). The modem 100 performs a synchronization with the wireless hub 110 that is presently preferred to be located within or control a head-end of a broadband wireless access system. The wireless modem preferably comprises a radio unit 120, comprising a transceiver or transmitter and receiver pair, and a wireless modem 130 that is in communication with the CPE 140.

The radio unit 120, and/or the entire wireless modem may be located indoors or outdoors.

A description of the operation flow and parameters for initialization transactions of a wireless modem is described in sections 9.1 and 9.2 of the Radio Frequency Interface Specification version 1.1 of the Data-Over-Cable-Interface-Specification (DOCSIS), Document #SP-RFIv1.1-I03-991105, which is incorporated herein by reference in its entirety as if set forth herein. The DOCSIS specification provides that the wireless modem first synchronize to the downstream channel, then to obtain the upstream channel parameters on the downstream channel, and then to perform ranging for setting the proper power and timing parameters.

It should be noted that although the present invention may be practiced on any frequency range, the presently preferred systems operate within the MMDS and LMDS frequency bands, which are in the ranges of between 2,150 to 2,162 MHz, 2500 to 2686 MHz and 17 to 40 GHz respectively, these operating frequencies are substantially greater than the operating frequencies specified in the Radio Frequency Interface Specification of DOCSIS. This creates several problems including higher frequency drift sensitivity and worsened signal loss.

Figure 3:
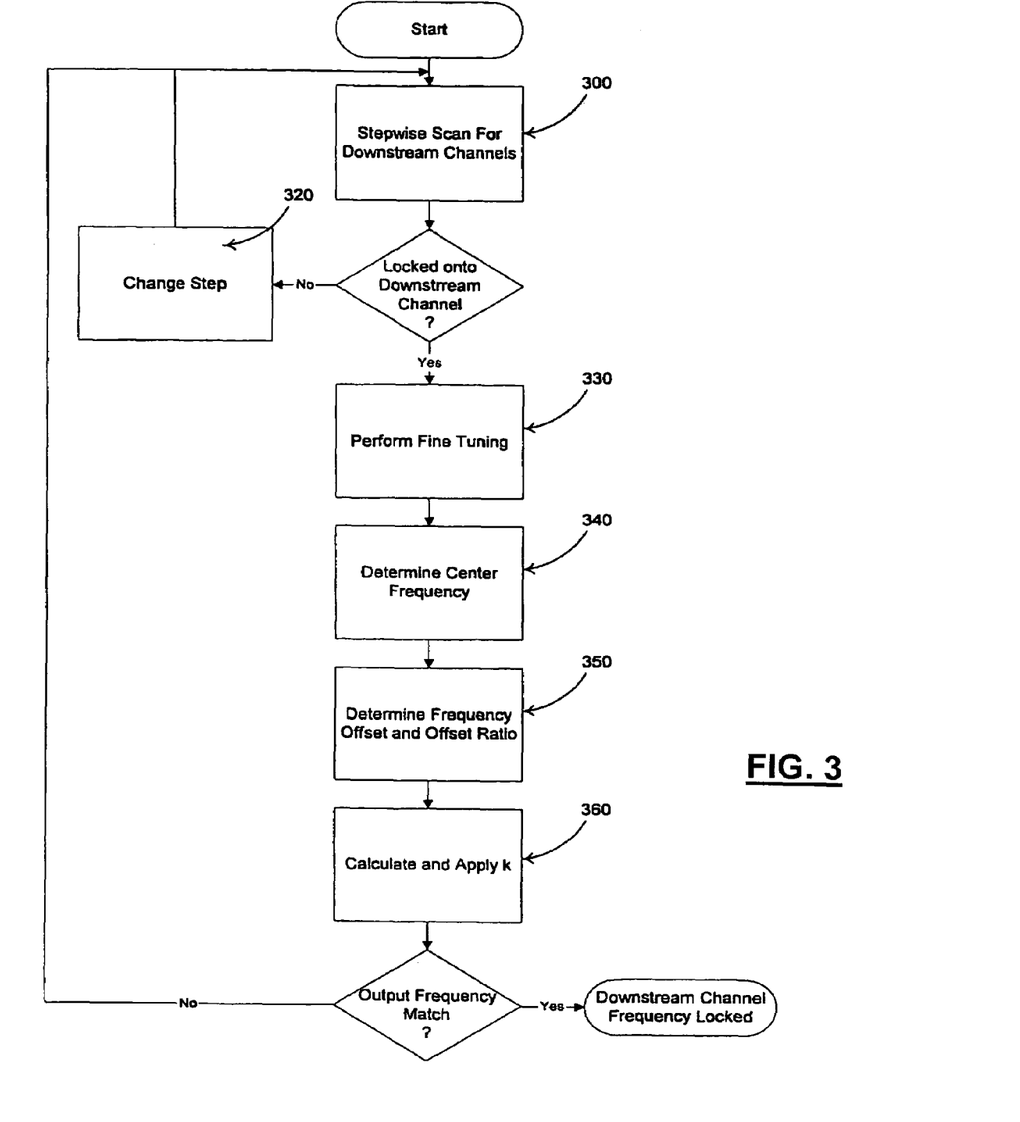
FIG. 3 is a flow chart of a high level process of the present invention.

FIG. 3 is a flow chart of a high level process of the present invention. At step 300, when a wireless modem powers up, or when the downstream channel is dropped, the wireless modem will scan in steps for a downstream channel. The starting frequency for the scan is preprogrammed into the wireless modem. First, it is preferred that the scan operate in large steps, preferably steps of 6 MHz, throughout the entire frequency range for the particular broadband wireless access system. The frequency range of the broadband wireless access system is preprogrammed into the wireless modem at the factory. If no downstream frequency has been found or locked onto using the large steps, then a second scan using smaller steps (see step 320, change step size of scan), preferably 1 MHz, is preferably made. If no frequency is locked onto or found using the smaller then a smooth scan, preferably utilizing n steps of 250 KHz.

After finding an active channel in some frequency so called the initial frequency, the wireless modem scans frequencies at intervals above and below the initial frequency. The intervals above and below are preferably an equal distant from the initial frequency. The step structure described herein is not intended to be limiting in any way, as the intervals may be constructed using any method. For example, steps may start at the center frequency and move in only a single direction, starting at the maximum frequency for the frequency range and moving downward, starting at the minimum frequency and moving upward, or starting at any frequency in the frequency range and moving in any direction and in any pattern.

After finding a set of one or more frequencies where the channel is received successfully, a fine-tuning is performed (step 330) based on the maximum and minimum edges of the downstream frequency band.

Figure 4:
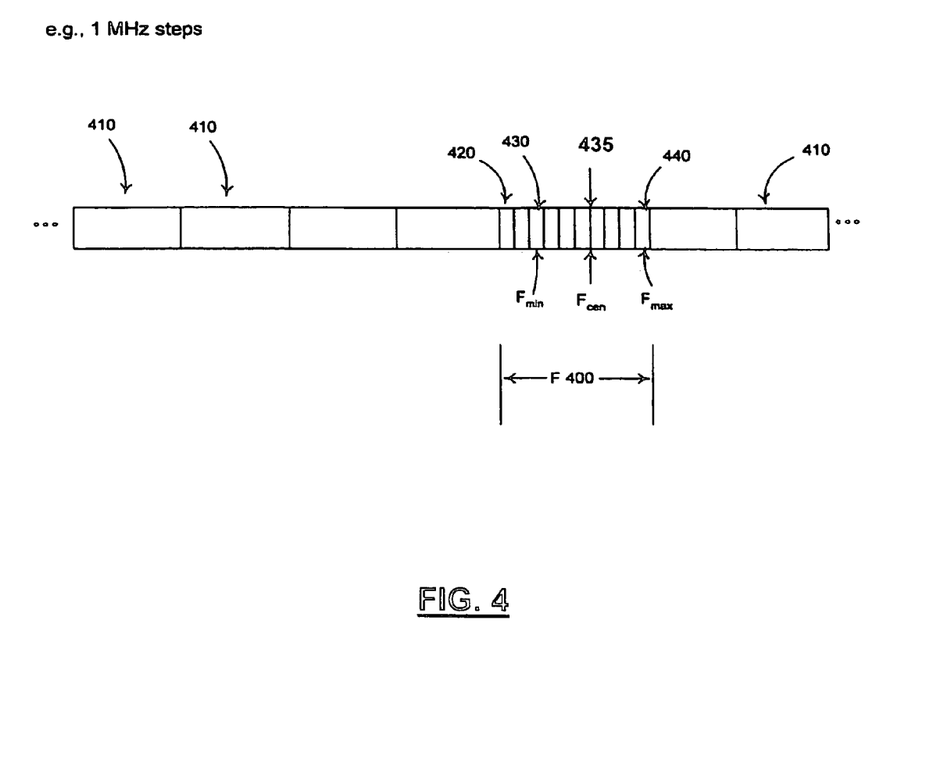
FIG. 4 is a frequency band illustration of a fine tuning process of the present invention.

The fine tuning process comprises dividing the downstream frequency formed into yet smaller bands to determine $f_{max}$ and $f_{min}$ edges. FIG. 4 shows an example of a downstream frequency that was locked onto (band) while scanning the frequency range with 1 MHz steps 410. The locked onto downstream frequency 400 is divided into a plurality of fine tuning increments 420. The edges $f_{min}$ 430 and $f_{max}$ 440 are the minimum and maximum frequencies where the downstream channel is acquired (locked onto) using the fine tuning increments. With these edges, the central frequency of the downstream channel can be determined as follows:

$$fcen\ (435) = (fmax + fmin)/2$$

At step 350, after determination of the center frequency, the frequency offset is determined. The presently preferred frequency offset is equal to (fnom−fcen) . The nominal frequency, $f_{nom}$, may be received in a downstream message, or selected as the closest standard frequency value from a set of known standard frequencies. The tuned downstream frequency is then changed to the center frequency. In a preferred embodiment, an offset ratio k is then calculated (step 360) as the ratio of a reference frequency $F_{ref}$ 200 supplied by the modem (that feeds the PLL 210 in FIG. 5) and the nominal frequency $F_{nom}$ ($k = F_{ref}/F_{nom}$). For example, $F_{nom} = 2.5$ GHz, $F_{cen} = 2.495$ GHz, $F_{ref} = 25$ Mhz, k=0.01, Frequency Offset=5 MHz, and the Correction=50 KHz.

Figure 5:
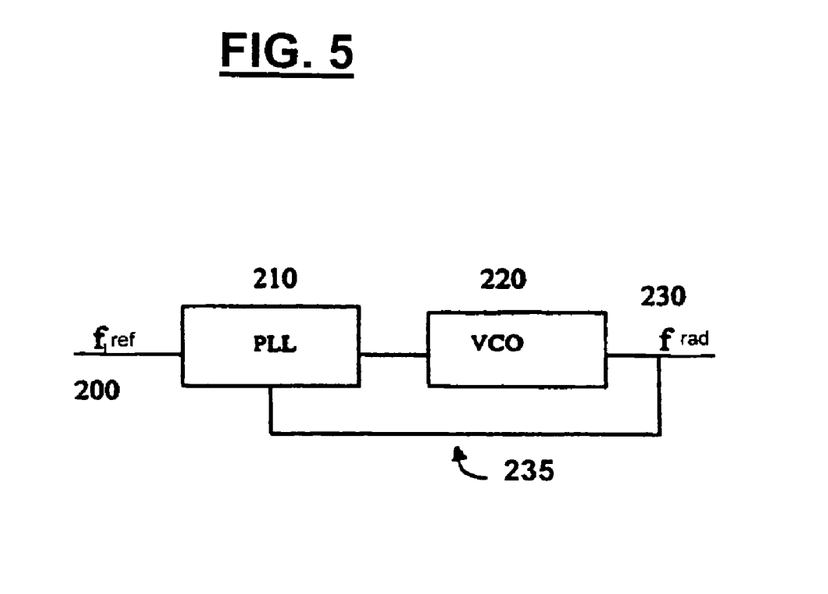
FIG. 5 is a block diagram of the frequency locking apparatus in a radio of a presently preferred embodiment of the present invention.

The PLL controls the VCO 220, which generates the RF frequency $F_{rad}$ 230. The correction to the reference frequency is calculated by multiplying the offset ratio by the offset frequency. The PLL 210 then applies k via feedback loop 235 to adjust the PLL output to VCO 220 (also step 360). The feedback loop results in a $f_{rad}$ 230 that approximates or matches a no offset frequency.

However, if the frequency still has an offset, a new set of calculations are performed as described above and the output frequency is checked again. This is done until such a time when the received frequency matches the correction to the reference frequency as calculated. At such a time, the downstream channel is locked with this set of values.

The upstream frequency used for the transmission will be the obtained frequency from the downstream channel UCD message as set out in the DOCSIS specifications. This message is transmitted periodically by the hub on the downstream channel and describes the upstream channel parameters, including the channel frequency.

In one embodiment, the downstream frequency can be estimated accurate enough for the needs of the upstream channel. In this case, since the radio frequency was corrected during downstream signal acquisition, as described above, it is presently preferred that no correction is required to the upstream frequency provided in the UCD message.

Figure 6:
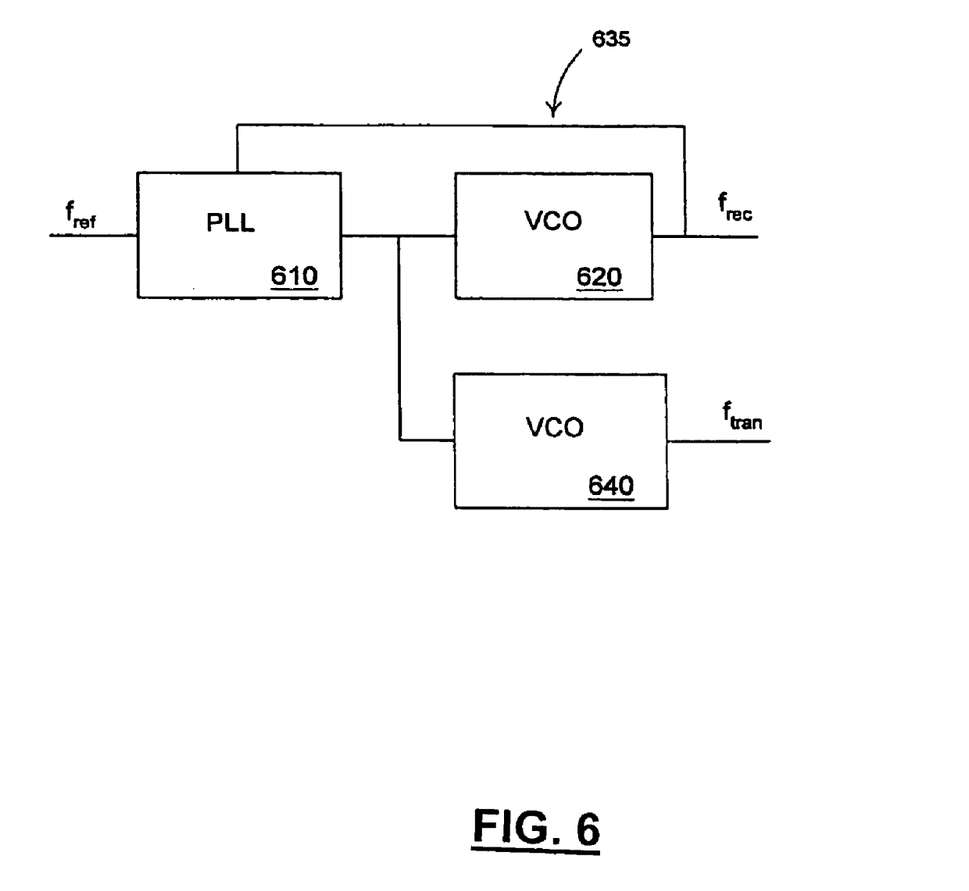
FIG. 6 is a block diagram of the frequency locking apparatus in a transmitter and receiver in an embodiment of the present invention.

For example, FIG. 6 is a block diagram illustrating production of a receiving frequency and a transmitting frequency. PLL 610, VCO 620, and feedback loop 635 operate similarly as PLL 210, VCO 220, and feedback loop 235 described above with reference to FIG. 5. Since $F_{rec}$ is locked onto the downstream channel, output from PLL 610 is highly accurate for matching the frequency shifting that may occur in the modem receiver and transmitting equipment of the hub. Applying this accurate output to transmitting VCO 640 then also results in a highly accurate transmission frequency $F_{tran}$.

In another embodiment, the downstream signal resolution is not enough for use in the upstream link. In wireless modems, it is preferred that the resolution is in the range of 62.5 kHz. This resolution is not enough for the accuracy of the upstream channel, which must contend with a multiple of other upstream channels. Therefore, an additional embodiment of the present invention provides for correcting of any offset of the upstream channel. Further, this offset correction can be used to dynamically correct the downstream channel receiver of the wireless modem.

After receiving the upstream frequency and other parameters in the UCD message, the wireless modem starts upstream transmission as part of the ranging process (as defined by Sections 9.2.4. 6.3.5 and 6.3.6 of the Radio Frequency Interface Specification of DOCSIS). If there is no response during the ranging process, the modem starts a scanning procedure in the upper and lower range of the upstream frequency band, as defined in the UCD, in order to find the correct upstream frequency. The frequency steps are fully configurable. When the ranging procedure is successfully completed, the upstream frequency is locked. This phase is presently preferred to be referred to as the closed loop. The deviation between the exact frequency and the obtained frequency is stored in memory.

Since this deviation is less than 62.5 kHz, based on the Radio Frequency Interface Specification of DOCSIS, it can be used to make a fine tuning correction to the downstream frequency. The corrections are performed during idle periods (when the modem has no data to transmit). The correction to the reference frequency can be made by changing the reference clock of the radio, when the radio comprises a transceiver. In the case of a separate upstream and downstream radios, the correction is made within the wireless modem by independently correcting each radio clock.

This deviation is kept in memory. Periodic measurements are performed. If a new deviation of 62.5 kHz or greater is detected, a new fine tuning correction is performed, as described above (again, this is performed during idle period/s).

Wireless modems operating in the broadband wireless access systems are generally line of sight operation sensitive. Since short-term disturbances may occur during operation, a special reaction function is preferably added to the wireless modem in order to avoid and/or minimize transmission failures and data loss.

A short term disturbance can be detected by the wireless modem by sensing an abrupt decrease in the measured power of a signal received on the downstream channel, a difference between the power of the currently received signal and an expected power is calculated. The expected power may be calculated as an amount of average power received in a previous predetermined time period. When a short term disturbance is detected by the wireless modem, the wireless modem will thereby immediately increase the power for upstream transmission.

The presently preferred time period for short-term disturbances is an interval of between 500 to 2550 msec. However, other time periods and a number of factors can go into determining the actual interval, which is determined to be a short-term disturbance.

The increase in power is presently preferred to be equal to the difference between the power of the currently received signal and an expected power is calculated. However, the power increase can be some predetermined multiple of the difference, can be the maximum power allowed for upstream transmission according to the applicable standards, or can be any other value greater than the power of the previously transmitted upstream signals. This increase in power is provided to avoid the wireless hub from being affected by the disturbance in the transmission [so long as the disturbance is only for a short term—why only short duration?].

While the embodiments, applications and advantages of the present invention have been depicted and described, there are many more embodiments, applications and advantages possible without deviating from the spirit of the inventive concepts described and depicted herein. The invention should only be restricted in accordance with the spirit of the claims appended hereto and is not restricted by the preferred embodiments, specification or drawings.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, acquiring downstream channels, reading description messages on the downstream channel, performing fine tuning, calculating offsets, applying offset ratios, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method for locking onto a downstream frequency by a wireless modem in a broadband wireless access system comprising:
   receiving at a radio coupled to the wireless modem, a plurality of signals at least one corresponding to a downstream signal being transmitted on a downstream frequency;
   determining, at the wireless modem, if the radio is locked onto the at least one downstream signal received at the radio;
   if the radio is locked onto the downstream signal, determining a center frequency of a detected frequency range corresponding to the downstream signal;
   if the radio is not locked onto the downstream signal, changing a receiving frequency of the radio by signals from the wireless modem according to a predetermined frequency plan until the radio is locked onto the one downstream signal and then determining the center frequency of the detected frequency range;
   determining a frequency offset factor; and
   transmitting an instruction from the wireless modem to the radio to operate a frequency other than the center frequency, the frequency other than the center frequency being a function of the frequency offset factor and center frequency.

2. The method of claim 1, wherein the predetermined frequency plan comprises altering the frequency of the radio by a plurality of steps, each of the steps comprising a first frequency and a second frequency, the first frequency being greater than a predetermined frequency and the second frequency being less than the predetermined frequency.

3. The method of claim 2, wherein the first and second frequency are separated from the predetermined frequency by approximately a same distance.

4. The method of claim 3, wherein for each frequency step the same distance is approximately a multiple of the same distance of a prior frequency step of the plurality of frequency steps.

5. The method of claim 1, wherein the offset factor is approximately equal to the center frequency divided by a nominal frequency.

6. The method of claim 5, wherein the receiver is coupled to a transmitter that transmits upstream signals from the wireless user device, the method further comprising offsetting a transmit frequency of transmitter circuitry located in the wireless user device according the frequency offset factor.

7. The method of claim 5, wherein the wireless user device provides signals for upstream transmission to a transmitter that transmits at an upstream frequency, the method further comprising offsetting the upstream frequency according to the offset factor.

8. The method of claim 7, wherein the wireless user device makes correction for the downstream frequency, based on corrections for the upstream frequency that are received from a hub.

9. The method according to claim 1, wherein:
said method is embodied in a set of computer readable instructions stored on a computer readable media; and
said computer readable instructions, when loaded into a computer and executed, cause the computer to perform the steps of claim 1.

10. A device, comprising:
a wireless modem;
a radio coupled to the wireless modem and configured to receive a plurality of signals at least one corresponding to a downstream signal being transmitted on a downstream frequency;
wherein:
the wireless modem is configured to,
determine if the radio is locked onto the at least one downstream signal received at the radio;
if the radio is locked onto the downstream signal, determine a center frequency of a detected frequency range corresponding to the downstream signal;
if the radio is not locked onto the downstream signal, changing a receiving frequency of the radio by signars from the wireless modem according to a predetermined frequency plan until the radio is locked onto the one downstream;
determine a frequency offset factor; and
transmit an instruction from the wireless modem to the radio to operate on a frequency other than the center frequency, the frequency other than the center frequency being a function of the frequency offset factor and center frequency.

11. The device according to claim 10, wherein the downstream signal is a data signal in a broadband wireless access system.

12. The device according to claim 10, wherein the predetermined frequency plan comprises altering the frequency of the radio by a plurality of steps, each of the steps comprising a first frequency and a second frequency, the first frequency being greater than a predetermined frequency and the second frequency being less than the predetermined frequency.

13. The device according to claim 10, wherein:
the first and second frequency are separated from the predetermined frequency by approximately a same distance; and
for each frequency step the same distance is approximately a multiple of the same distance of a prior frequency step of the plurality of frequency steps.

14. The method of claim 10, wherein the offset factor is approximately equal to the center frequency divided by a nominal frequency.

* * * * *